US009266468B2

(12) United States Patent
Mizushiro et al.

(10) Patent No.: US 9,266,468 B2
(45) Date of Patent: Feb. 23, 2016

(54) LINEAR LIGHTING DEVICE

(71) Applicant: TOYODA GOSEI CO., LTD., Kiyosu-shi, Aichi-ken (JP)

(72) Inventors: Tetsu Mizushiro, Kiyosu (JP); Yukihiko Umeda, Kiyosu (JP); Shinichi Ogawa, Nagoya (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 175 days.

(21) Appl. No.: 13/939,148

(22) Filed: Jul. 10, 2013

(65) Prior Publication Data

US 2014/0029292 A1    Jan. 30, 2014

(30) Foreign Application Priority Data

Jul. 27, 2012  (JP) ................... 2012-166844
Sep. 28, 2012  (JP) ................... 2012-215684
Dec. 26, 2012  (JP) ................... 2012-282848

(51) Int. Cl.
*G02B 6/42*    (2006.01)
*B60Q 3/00*    (2006.01)
*F21V 8/00*    (2006.01)
*B60Q 3/02*    (2006.01)

(52) U.S. Cl.
CPC .............. *B60Q 3/002* (2013.01); *B60Q 3/004* (2013.01); *B60Q 3/0289* (2013.01); *G02B 6/001* (2013.01); *G02B 6/0038* (2013.01)

(58) Field of Classification Search
CPC ........ B60Q 3/004; B60Q 3/002; G02B 6/001; G02B 6/0038; G02B 6/0088; F21S 10/005; F21V 2008/00; F21V 2008/003; F21Y 2103/00–2103/003
See application file for complete search history.

(56) References Cited

U.S. PATENT DOCUMENTS

| 7,210,829 B2 | 5/2007 | Okazaki et |
| 2006/0056789 A1* | 3/2006 | Saito et al. .............. 385/140 |
| 2009/0201696 A1 | 8/2009 | Kamikatano et al. |

FOREIGN PATENT DOCUMENTS

| JP | 2009269492 A | 11/2009 |
| JP | 4463246 B2 | 2/2010 |
| JP | 4737241 B2 | 5/2011 |
| JP | 2011240811 A | 12/2011 |

* cited by examiner

*Primary Examiner* — Julie Bannan
(74) *Attorney, Agent, or Firm* — Posz Law Group, PLC; David Posz

(57) ABSTRACT

The present invention provides a linear lighting device which includes an elongated light guide, a light source disposed at an end in a longitudinal direction of the light guide, and a case accommodating the light guide and the light source. In the linear lighting device, the light guide has a plurality of grooves arranged in the longitudinal direction of the light guide, and has a stepped cutout at the other end on an opposite side from the end, and a protruding portion protruding into the cutout is formed on an inner surface of the case which faces the cutout.

23 Claims, 12 Drawing Sheets

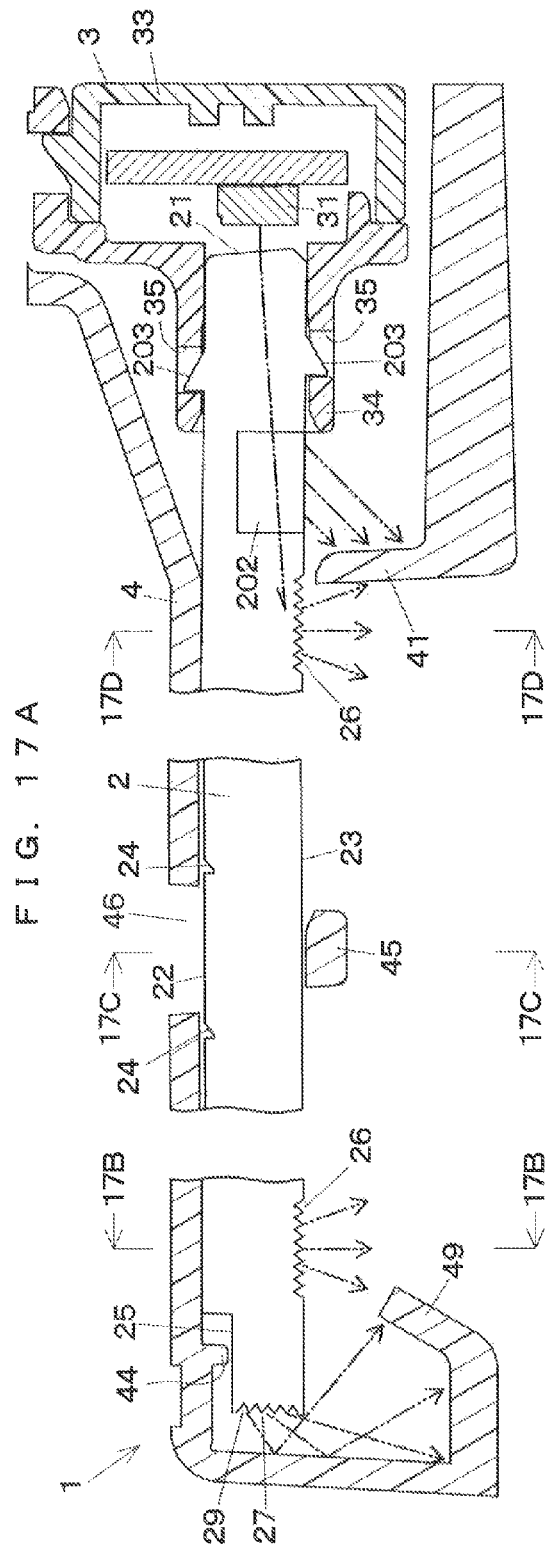

F I G. 19A
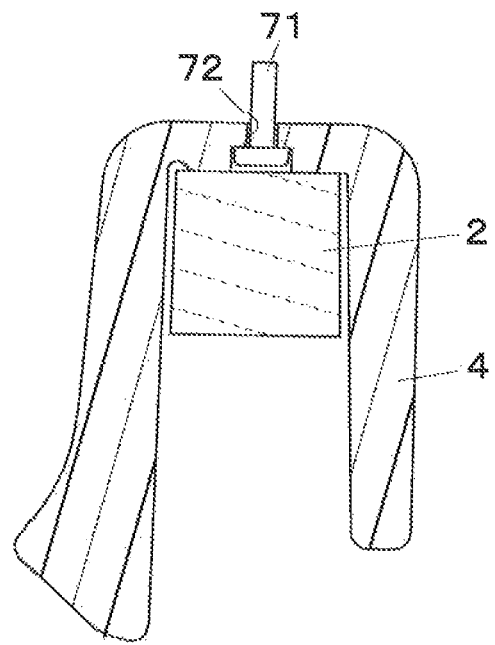
F I G. 19B
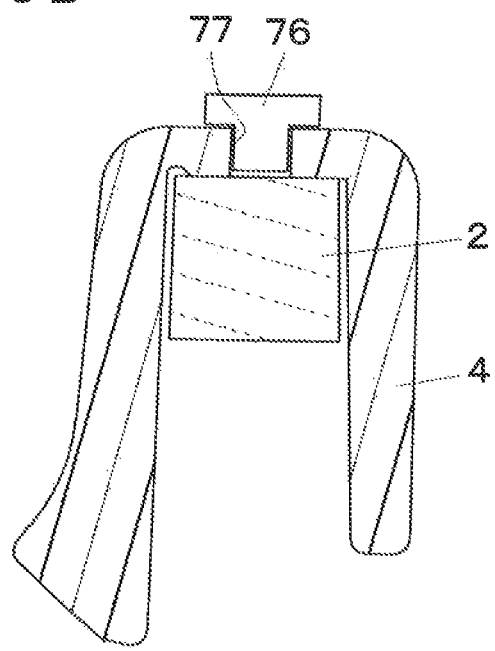

LINEAR LIGHTING DEVICE

TECHNICAL FIELD

The present invention relates to linear lighting devices using primarily an LED as a light source and using an elongated light guide.

BACKGROUND ART

These days, there are more opportunities to use LEDs for automobile lighting. Since the LEDs are a directional point-like light source, they are used as light sources for vehicle interior lighting or vehicle exterior lighting by changing a lighting condition (lighting pattern) by using a lens or a light guide. FIG. 1 shows various examples of lighting applications in which a light source and an illumination target (an object to be illuminated) are located close to each other, such as lighting inside storage spaces such as a glove compartment and a cup holder, interior foot lighting, lighting for operating portions such as switches, mood lighting for improved appearance or decoration of an instrument panel, a trim, etc., and various types of illumination. Such lighting applications do not require so much light. Accordingly, an illumination mode different from conventional examples can be implemented and improved design can be achieved by converting point-like light emission of the LEDs to linear light by a light guide. For example, Patent Literatures 1 to 4 are known as such linear lighting devices using a linear light guide.

CITATION LIST

Patent Literature

Patent Literature 1: Japanese Patent No. 4737241
Patent Literature 2: Japanese Patent No. 4463246
Patent Literature 3: Japanese Patent Application Publication No. 2009-269492
Patent Literature 4: Japanese Patent Application Publication No. 2011-240811

SUMMARY OF INVENTION

Technical Problem

When such linear lighting devices are used for vehicular lighting, particularly for vehicle interior lighting, this elongated linear light guide is disposed inside an interior member or a storage member such that it cannot be directly visually recognized, in order to prevent glare to a driver or an occupant which hinders the driving operation. Accordingly, even if light is converted to linear light by the light guide, part of the light is blocked, reflected, etc. by the interior member or the storage member, resulting in an undesirable illumination pattern. Since the distance between the light source (light guide) and the illumination target (region to be illuminated) is as short as about 20 to 200 mm in such vehicle interior lighting applications, this particularly tends to be visually recognized as non-uniform luminance or a difference in brightness, or a blight line due to the reflected light.

Such a linear light guide is a very thin, long member having a diameter (length of one side if it is quadrilateral in section) of about 2 to 5 mm and a length of about 100 to 1,000 mm. This linear light guide therefore cannot provide a desired lighting effect due to bending by its own weight or due to twist upon attachment. Moreover, the linear light guide tends to be bent or damaged upon assembly. In the light guide having a fixed reflecting surface and a fixed light emitting surface, the light guide need be attached in the right direction. However, since the light guide is transparent, it is difficult to verify the direction of the light guide, leading to misassembly.

It is an object of the present invention to provide a linear lighting device using an elongated light guide, which is easy to fix to an attachment member, can prevent misassembly, and can produce a high quality illumination pattern.

Solution to Problem

In order to solve the above problems, a linear lighting device according to an aspect of the present invention includes: an elongated light guide; a light source disposed at an end in a longitudinal direction of the light guide; and a case accommodating the light guide and the light source. In the linear lighting device, the light guide has a plurality of grooves arranged in the longitudinal direction of the light guide, and has a stepped cutout at the other end on an opposite side from the end, and a protruding portion protruding into the cutout is formed on an inner surface of the case which faces the cutout.

With this configuration, the cutout and the protruding portion can prevent misassembly.

A side surface of the light guide which extends along the longitudinal direction of the light guide serves as an emitting surface, and the case opens along the longitudinal direction of the light guide so as to expose the emitting surface of the light guide.

With this configuration, the case can protect the light guide, and can reflect leakage light from a surface other than the emitting surface of the light guide toward the emitting surface.

The cutout may be formed on any of a reflecting surface side, an emitting surface side, and a side surface side of the other end of the light guide.

However, the cutout is preferably formed on the emitting surface side of the other end of the light guide. This configuration reduces occurrence of the phenomenon that an undesirable illumination pattern is formed by stray light produced by light reflection by the cutout, as compared to the case where the cutout is provided on the reflecting surface side. Thus, a higher quality illumination pattern can be produced.

A light shielding wall that covers the emitting surface, the cutout, and the protruding portion is provided at the other end on an opposite side of the opening of the case from the light source in the longitudinal direction of the light guide.

With this configuration, the light shielding wall blocks stray light that is produced by light reflection by the cutout and the protruding portion which are provided to prevent misassembly. This can reduce non-uniformity of light at the other end on the opposite side from the light source, whereby a high quality illumination pattern can be produced.

A light shaping wall whose wall surface has a curved shape curved in a direction away from the light source is provided on an opening side of the light shielding wall of the case.

With this configuration, it is possible to obtain a gradational illumination mode in which the width of the illumination pattern gradually decreases and the illumination pattern becomes vaguer at the other end of the illumination pattern, whereby the other end of the illumination pattern has gradually decreased illuminance. This can give the viewer an impression of spaciousness along the linear illumination pattern. Since the end of the illumination pattern is formed by the light shaping wall rather than by the light shielding wall, both ends of the illumination pattern are balanced, whereby a high quality illumination pattern can be produced.

The plurality of grooves have a V-shaped or U-shaped section along the longitudinal direction of the light guide, and are arranged at regular intervals in the longitudinal direction of the light guide, and the grooves and the cutout are formed so that their respective surfaces facing the light source have similar shapes. As used herein, the "V-shape" means the shape of the groove with its two inner side surfaces bent and connected together at the bottom. The two inner side surfaces are not limited to flat surfaces, and at least one of the two inner side surfaces may be a curved surface. The "U-shape" means the shape of the groove with its two inner side surfaces curved and connected together at the bottom. The two inner side surfaces are not limited to flat surfaces, and at least one of the two inner side surfaces may be a curved surface. Thus, the "U-shape" includes a semicircular shape, a semielliptical shape, etc.

With this configuration, reflection patterns produced by the grooves and the cutout can be approximated, whereby a high quality illumination pattern can be produced.

An interval between the groove adjoining the cutout and the cutout is equal to that between adjoining ones of the grooves.

With this configuration, illumination patterns produced by the respective reflecting surfaces of the grooves and the cutout are arranged at regular intervals, whereby a high quality illumination mode can be obtained in the entire linear illumination pattern.

A light shielding wall that faces the emitting surface of the light guide is provided at an end on a light source side of the opening of the case in the longitudinal direction of the light guide, and a light scattering portion is formed on the emitting surface so as to include a region facing the light shielding wall.

This configuration can reduce non-uniformity of light at the end on the light source side, whereby a high quality illumination pattern can be produced.

A light shielding wall that covers the emitting surface of the light guide is provided at the other end on the opposite side of the opening of the case from the light source in the longitudinal direction of the light guide, and a light scattering portion is formed on the emitting surface so as to include a region facing the light shielding wall on the opposite side from the light source.

This configuration can reduce non-uniformity of light at the other end on the opposite side from the light source, whereby a high quality illumination pattern can be produced.

A light scattering portion is formed on an end face of the other end of the light guide.

With this configuration, light that has reached the other end can be actively emitted to the outside of the light guide.

A light shielding wall that covers the emitting surface and that has a curved shape curved toward the light source is provided at an end on the light source side of the opening of the case in the longitudinal direction of the light guide, and a light shielding wall that covers the emitting surface is provided at the other end on an opposite side of the opening of the case from the light source in the longitudinal direction of the light guide, and a light shaping wall whose wall surface has a curved shape curved in a direction away from the light source is provided on the opening side with respect to the light shielding wall.

With this configuration, it is possible to obtain a gradational illumination mode in which the width of the illumination pattern gradually decreases and the illumination pattern becomes vaguer at both ends of the illumination pattern, whereby both ends of the illumination pattern have gradually decreased illuminance. This can give the viewer an impression of spaciousness along the linear illumination pattern. Since the end of the illumination pattern is formed by the light shaping wall rather than by the light shielding wall on the other end side, both ends of the illumination pattern are balanced, whereby a high quality illumination pattern can be produced.

The curved shape of the light shielding wall on the light source side is curved to a greater extent than that of the light shaping wall, and a distal end of the light shaping wall has a curved shape reduced in size from the curved shape of the light shielding wall on the light source side in the longitudinal direction of the light guide. The distal end of the light shaping wall is located on the opening side at a position farther away from the emitting surface than the light shielding wall on the light source side in a depth direction of the opening.

With this configuration, both ends of the illumination pattern are balanced, whereby a higher quality illumination pattern can be produced.

The case has a hole extending therethrough, and the hole is formed so as to be located between adjoining ones of the grooves of the light guide.

This configuration can prevent light reflected to the outside by the grooves of the light guide from leaking from the hole.

The hole is not particularly limited, but examples of the hole include a through hole formed in the case where a latching protrusion that latches the light guide contained in a reflector is formed on the inner surface of a wall, namely a hole for releasing a mold formed so that a mold can be released even if the latching protrusion is an undercut when the reflector is resin molded, a lightening hole formed to reduce the weight by reducing thickness a reflector, a screw hole in which a fixing unit such as a screw that fixes the reflector is fittingly inserted, a fitting hole in which an object to be engaged is fitted in order to fix or position the object in the case, etc.

Preferably, the light scattering portion is formed in a range of at least 2 mm and at most 10 mm from a boundary between the light shielding wall on the light source side and the opening toward the opening.

If the length from the boundary between the light shielding wall on an incident surface side and the emitting opening is less than 2 mm, the effect of blurring the boundary between bright and dark regions on the light receiving surface is reduced. If this length exceeds 10 mm, the range in which light is scattered is increased, whereby illumination quality may be reduced.

An incident surface at the end of the light guide is tilted to face a reflecting surface of the light guide in which the plurality of grooves are arranged so that the incident surface refracts an optical axis of the light source toward the reflecting surface when light is incident on the incident surface, and the incident surface is tilted by 3 to 7° with respect to a plane perpendicular to the reflecting surface.

Alternatively, the incident surface at the end of the light guide is tilted to face the emitting surface so that the incident surface refracts an optical axis of the light source toward the emitting surface when light is incident on the incident surface, and the incident surface is tilted by 3 to 7° with respect to a plane perpendicular to the optical axis of the light source.

This configuration prevents the phenomenon that the light of the light source reaches the other end side of the light guide with little reflection in the light guide and the amount of light emitted from the other end side is larger than the amount of light on the incident surface side. Uniform linear light can be obtained by reflection in the light guide.

The incident surface of the light guide has a light incidence limiting portion that limits an amount of incident light from the light source. Examples of the light incidence limiting portion include the incident surface from which a periphery of a region crossing the optical axis of the light source has been removed, a light shielding member that blocks part of the light of the light source, etc.

With this configuration, the amount of incident light from the light source can be limited, and the amount of light according to the length of the light guide can be supplied.

Advantageous Effects of Invention

According to the present invention, a linear lighting device can be provided which is easy to fix to an attachment member, can prevent misassembly, and can produce a high quality illumination pattern.

BRIEF DESCRIPTION OF DRAWINGS

FIG. 17A is a sectional view of the linear lighting device, FIG. 17B is a sectional view taken along line 17B-17B in FIG. 17A, FIG. 17C is a sectional view taken along line 17C-17C in FIG. 17A, and FIG. 17D is a sectional view taken along line 17D-17D in FIG. 17A;

FIG. 19A is a sectional view of a modification of a hole, and FIG. 19B is a sectional view of another modification.

DESCRIPTION OF EMBODIMENTS

A linear lighting device of the present invention will be described below with reference to the accompanying drawings.

In each drawing, elements are shown in a simplified manner for description, and their scale and size are different from the actual ones.

Figure 1:
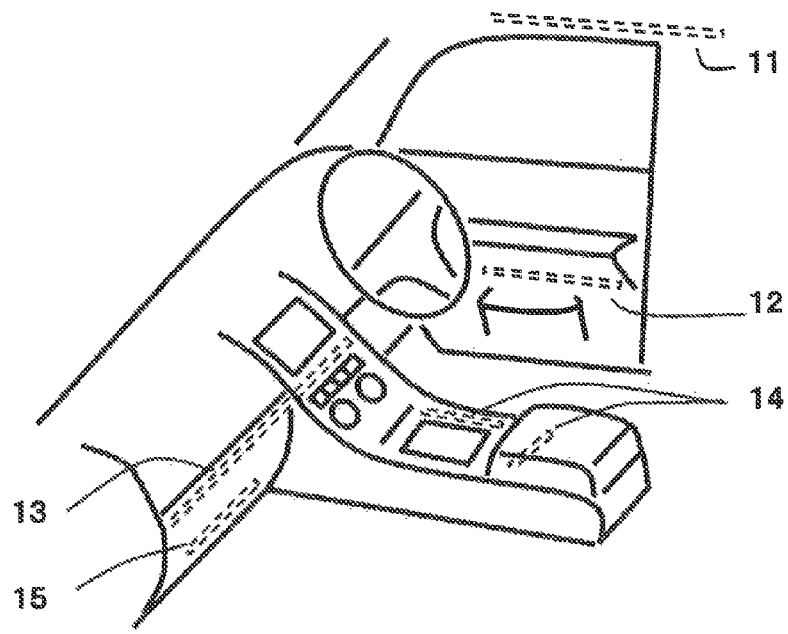
FIG. 1 is a schematic view of a linear lighting device of the present invention applied to vehicle interior lighting.

FIG. 1 is a schematic view of an example in which the linear lighting device of the present invention is applied to vehicle interior lighting. The linear lighting device 1 of the present invention can be used as, e.g., a ceiling light 11 that is mounted on a ceiling of a vehicle compartment, a door trim light 12 that is mounted on a door trim and illuminates an armrest, a switch and/or the inside of a pocket in a lower part of a door, an instrument panel light 13 that is disposed in an instrument panel so as to extend in the lateral direction of a vehicle and illuminates the inside of a glove compartment or an operating portion of the instrument panel, a storage light 14 that illuminates a console box or a cup holder, a foot light 15 that illuminates an area around occupant's feet.

The present invention can be used in applications other than those described above. The present invention is not limited to the vehicle interior lighting, and may be used for vehicle exterior lighting, or lighting for products other than vehicles.

First Embodiment

A linear lighting device 1 of a first embodiment will be described with reference to FIGS. 2 to 7.

Figure 2:
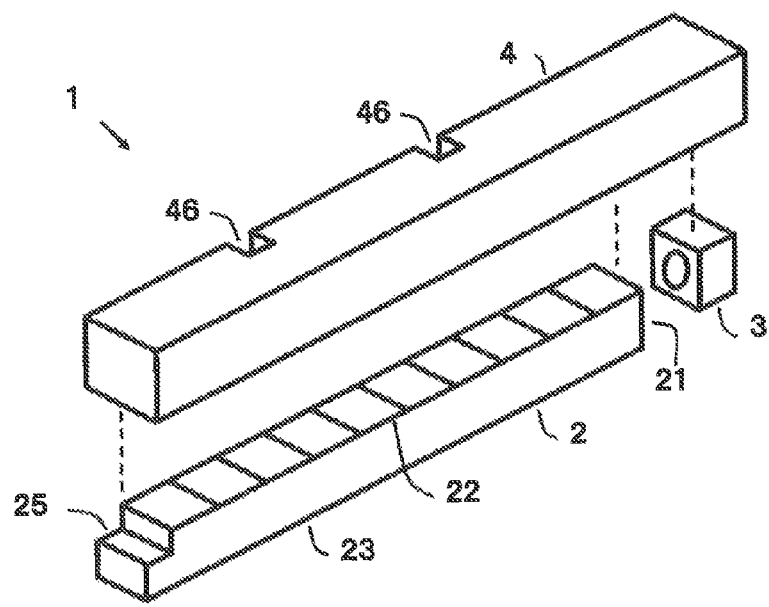
FIG. 2 is an exploded perspective view of a linear lighting device of a first embodiment.
Figure 3:
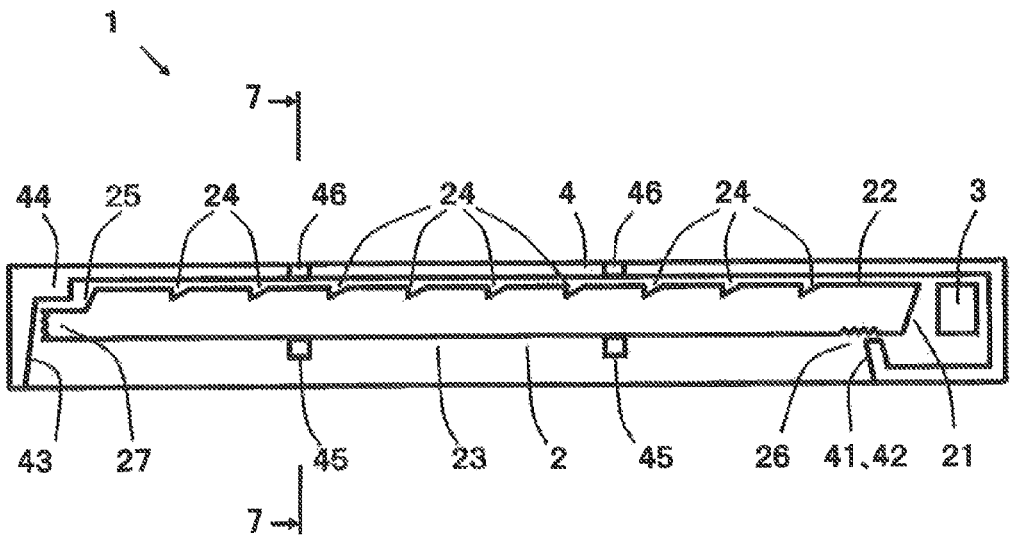
FIG. 3 is a longitudinal section of the linear lighting device.

FIG. 2 is an exploded perspective view of the linear lighting device 1. The linear lighting device 1 is formed by an elongated light guide 2, a light source 3, and a case 4 accommodating the light guide 2 and the light source 3. A connector (not shown) that supplies electric power to the light source 3 is connected to the light source 3.

Light Guide 2

The light guide 2 is molded by a transparent resin, has an elongated long outer shape, and has a quadrilateral section perpendicular to the longitudinal direction of the light guide 2. The light guide 2 has an incident surface 21, a reflecting surface 22, and an emitting surface 23. The incident surface 21 is provided at an end in the longitudinal direction of the light guide 2. The reflecting surface 22 is a side surface extending parallel to the longitudinal direction, and the emitting surface 23 is a side surface extending along the longitudinal direction and facing the reflecting surface 22. In the present embodiment, the longitudinal length of the light guide 2 is about 500 mm, and the quadrilateral section of the light guide 2 is a 5 mm by 5 mm square. The light source 3 is disposed at the end in the longitudinal direction so as to face the incident surface 21. The light guide 2 guides along the longitudinal direction the light emitted from the light source 3 and incident on the light guide 2 to an end (the other end) located on the opposite side from the light source 3 in the longitudinal direction of the light guide 2. The guided light is reflected by the reflecting surface 22 toward the emitting surface 23, and is emitted from the emitting surface 23, thereby linearly illuminating an illumination target. Each configuration of the light guide 2 will be described in detail below.

Figure 4A:
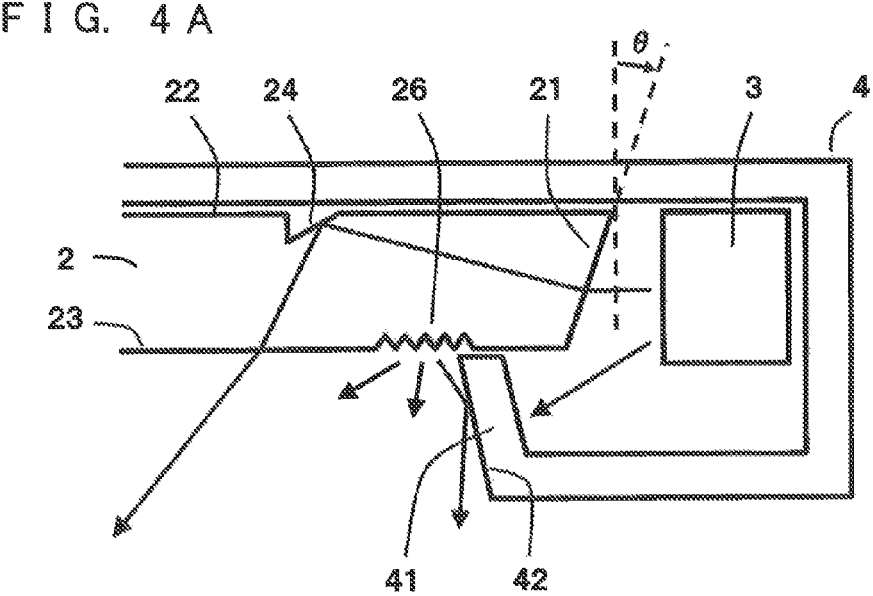
FIG. 4A to 4F are enlarged views on the light source side of FIG. 3.

As shown in FIG. 4A, the incident surface 21 is tilted to face the reflecting surface 22 so that the optical axis of the light source 3 is refracted toward the reflecting surface 22 when light is incident on the incident surface 21. In the case where an LED as a directional light source is used as the light source 3, a large amount of light is emitted in the optical axis direction. If the incident surface 21 is perpendicular to both the reflecting surface 22 and the optical axis of the light source 3, light on the optical axis of the light source 3 is incident on the light guide 2 with little refraction, and reaches the other end of the light guide 2 with little reflection within the light guide 2. Thus, the amount of light that is emitted from the other end is larger than the amount of light incident on the incident surface 21, and it is difficult to uniformly linearly emit light from the light guide. However, since the incident surface 21 is tilted to face the reflecting surface 22, most of incident light is refracted toward the reflecting surface 22, whereby uniform linear light can be obtained. In order to obtain this advantage, the incident surface 21 is tilted by an angle θ of 3 to 7 degrees with respect to a plane perpendicular to the reflecting surface 22, although it depends on the length of the light guide 2.

Although the optical axis of the light source 3 is parallel to the longitudinal direction of the light guide 2 in the above example, the light source 3 may be tilted such that its optical axis crosses the reflecting surface 22, instead of tilting the incident surface 21. In the case of tilting the light source 3, the tilt angle need be adjusted according to the length of the light guide 2. This requires a large number of peripheral members for attachment of the light source 3. Accordingly, it is preferable to change only the tilt angle θ of the incident surface 21 with the direction of the light source 3 being fixed, because it improves productivity.

The reflecting surface 22 is a side surface along the longitudinal direction of the light guide 2, and has grooves 24 formed at regular intervals along the longitudinal direction of the light guide 2. Each groove 24 has a V-shaped section along the longitudinal direction of the light guide 2. The surface of the groove 24 which faces the incident surface 21 has a function to reflect and scatter the light guided from the incident surface 21 toward another side surface of the light guide 2. The depth of the grooves 24 is gradually varied so that the grooves 24 located farther from the incident surface 21 have a greater depth.

Figure 4B:
Figure 4C:
Figure 4D:
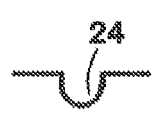
Figure 4E:
Figure 4F:
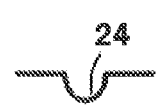

As shown in FIG. 4A, the groove 24 may have such a V-shape that its surface on the opposite side from the incident surface 21 extends vertically. As shown in FIG. 4B, the groove 24 may have such a V-shape that its surface on the opposite side from the incident surface 21 is tilted in the opposite direction from its surface facing the incident surface 21. As shown in FIG. 4C, the groove 24 may have such a V-shape that its surface facing the incident surface 21 forms a quarter circle and its surface on the opposite side from the incident surface 21 extends vertically. As shown in FIG. 4D, the groove 24 may have a U-shape including a vertical surface portion. As shown in FIG. 4E, the groove 24 may have a semicircular U-shape. As shown in FIG. 4F, the groove 24 may have a semielliptical U-shape.

Figure 5:
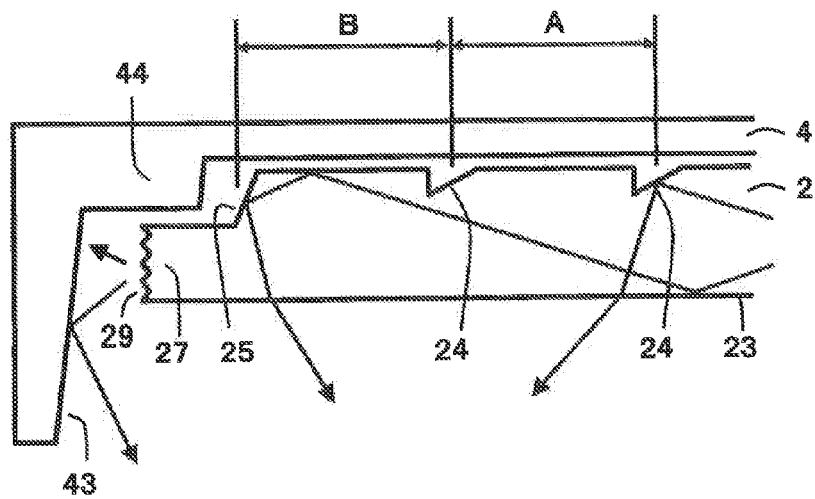
FIG. 5 is an enlarged view on the other end side of FIG. 3.

A step-like cutout (step) 25 rather than the V-shaped groove 24 is formed in the reflecting surface 22 at the end (the other end) on the opposite side from the incident surface 21 in the longitudinal direction of the light guide 2. In the present embodiment, the surface of the cutout 25 which faces the incident surface 21 is also tilted to face the emitting surface 23 so that the cutout 25 also has a reflecting function. In order for the reflected light from the grooves 24 and the reflected light from the cutout 25 not to form different illumination patterns, the grooves 24 and the cutout 25 are formed so that their respective surfaces facing the incident surface 21 have similar shapes. Thus, the illumination patterns formed by the reflected light from these surfaces have similar shapes, and a different illumination pattern can be prevented from being produced at the other end. As shown in FIG. 5, the grooves 24 and the cutout 25 are arranged such that the interval A between adjoining ones of the grooves 24 is the same as the interval B between the cutout 25 and the groove 24 adjoining the cutout 25. Thus, the illumination patterns respectively formed by the reflecting surfaces of the grooves 24 and the cutout 25 are located at regular intervals, whereby a high quality illumination mode can be obtained in the overall linear illumination pattern.

As described below, the cutout 25 can also be used as a mating portion that prevents misassembly to the case 4. This improves productivity.

Figure 6:
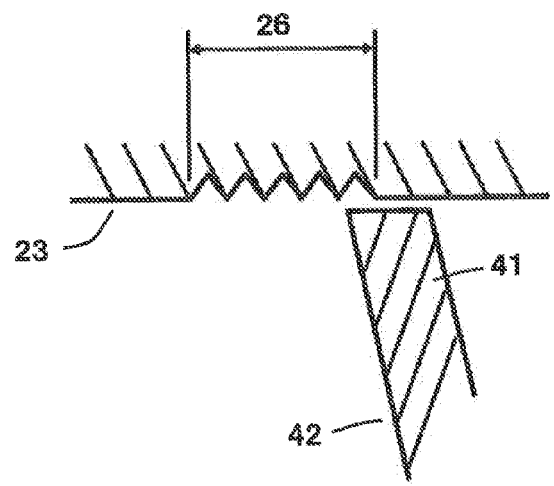
FIG. 6 is a schematic view showing the positional relation between a light scattering portion of a light guide and a reflecting surface of a case.

The emitting surface 23 is a side surface facing the reflecting surface 22 along the longitudinal direction of the light guide 2. The emitting surface 23 has a light scattering portion 26 as a concavo-convex portion in a region located on the light source side and facing the case 4. If the emitting surface 23 is located closer to the case 4, light is significantly blocked or reflected by the case 4, which results in an undesirable illumination pattern as a difference in brightness or a bright line by reflected light. In particular, in the case of a linear lighting device using a light guide, this problem may occur at both ends of the linear lighting device on the incident surface side and the other end side. By providing the light scattering portion 26 in the emitting surface 23 of the light guide 2 near the case 4, light that can be blocked or reflected by the case 4 is intentionally scattered, whereby a high quality illumination pattern can be obtained as a whole. As shown in FIGS. 4A and 6, the light scattering portion 26 is provided such that its end on the light source 3 side faces an end of the case 4 (light shielding wall 41 described below). This can prevent the end of the case 4 from being located on a region where the light scattering portion 26 is not formed, due to displacement between the light scattering portion 26 and the case 4 by a manufacturing error. If the light scattering portion 26 extends beyond the region facing the case 4 toward the light source 3, light leaks from the light guide 2. It is therefore desirable to form the light scattering portion 26 such that the end of the light scattering portion 26 faces the end (light shielding wall 41) of the case 4.

The shape of the light scattering portion 26 is not limited to the concavo-convex shape of the present embodiment, and a layer or film having a light scattering effect may be printed, bonded, etc. as the light scattering portion 26. However, forming the concavo-convex shape in the light guide itself is preferable because the light scattering portion 26 can be integrally molded when the light guide 2 is molded.

Light Source 3

The light source 3 is an LED, and is disposed such that its optical axis extends parallel to the longitudinal direction of the light guide 2. An electric bulb etc. may be used as the light source. However, since the light source used in the present invention needs to emit light to a position far from the light source in the longitudinal direction in order to provide linear illumination, the electric bulb that emits light in a radial pattern in all directions is not very preferable. Since the LED as a directional light source can emit most of light in the optical axis direction, the LED can be preferably used in the linear lighting device 1 of the present invention. A bullet LED, a surface mount (top view) LED, a side mount (side view) LED, a chip on board (COB) LED, etc. can be used as appropriate according to the size and desired characteristics. The connector, not shown, is connected to the light source 3 so that electric power can be supplied from the connector to the light source 3.

Case 4

The case 4 is an elongated box member, and is open at its one side surface along the longitudinal direction. The case 4 accommodates the light guide 2 and the light source 3. The case 4 can be formed by injection molding of a resin. The use of resin molding can reduce the weight, whereby the case 4 can be preferably used for lighting in the vehicle compartment.

As shown in FIG. 4A, the case 4 has the light shielding wall 41 in a portion located on the light source side in the longitudinal direction and facing the emitting surface 23 of the light guide 2. The light shielding wall 41 is provided so as not to cause leakage of the light that has not been incident on the light guide 2 from the light source 3. In order to prevent such light leakage, the light shielding wall 41 is disposed near the emitting surface 23 of the light guide 2 such that the distal end of the light shielding wall 41 faces the emitting surface 23, and as described above, the light scattering portion 26 is formed on the emitting surface 23 so that a part of the light scattering portion 26 faces the light shielding wall 41. This suppresses the influence of the light shielding wall 41 on the radiation pattern, whereby a uniform radiation pattern having uniform luminance can be obtained. The light shielding wall 41 functions as a reflecting surface 42 as it is tilted toward the opening of the case 4, whereby light emitted from the emitting surface 23 and the light scattering portion 26 can be reflected toward the illumination target. This together with the light scattering effect of the light scattering portion 26 can increase the amount of light near the light shielding wall 41.

At the end (the other end) on the opposite side from the light source side in the longitudinal direction, the inner surface of the case 4 is tilted toward the opening so as to reflect light. The inner surface of the case 4 thus functions as a reflecting surface 43. Like the light shielding wall 41, this can reduce the difference in brightness at the longitudinal end of the radiation pattern. The light guide 2 has a light scattering portion 27 having a concavo-convex shape at its end (end face 29) facing the reflecting surface 43, so that light that has reached this end can be actively emitted to the outside of the light guide 2. The combination of the light scattering portion 27 and the reflecting surface 43 can thus increase the amount of light at the end (the other end) located on the opposite side from the light source 3 in the longitudinal direction.

The case 4 has a protruding portion 44 at its end located on the opposite side from the light source 3 in the longitudinal direction. The protruding portion 44 protrudes toward the cutout 25 of the light guide 2. The protruding portion 44 is formed so as to be located in the cutout 25 in the state where the linear lighting device 1 is assembled. With this configuration, if the light guide 2 is attached in a different direction, the protruding portion 44 interferes with the light guide 2, whereby misassembly can be recognized. Providing such a structure at the end in the case 4 can suppress the influence on the optical properties of the light guide 2.

Figure 7:
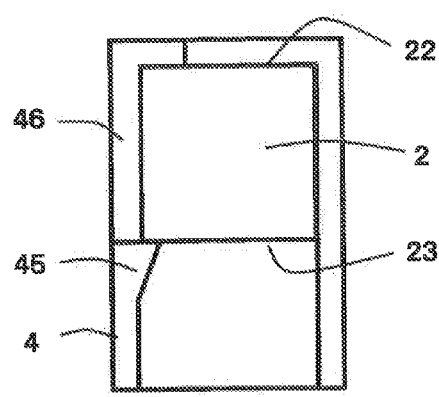
FIG. 7 is a sectional view taken along line 7-7 in FIG. 3.

The configuration that fixes and holds the light guide 2 in the case 4 will be described. FIG. 7 shows a section (7-7 sectional view) of the linear lighting device 1 perpendicular to the longitudinal direction. In this section, the case 4 has a U-shape having one side open, and having both side surfaces and a bottom surface. A fixing portion 45 protrudes from the inner surface of the side surface of the case 4 so as to support the emitting surface 23 of the light guide 2. This fixing portion 45 is disposed between adjoining two of the grooves 24 so as not to block light reflected to the outside by the grooves 24 of the light guide 2.

In the case of forming the fixing portion 45 protruding from the side surface of the case 4 by resin injection molding, the fixing portion 45 is an undercut, which reduces moldability. Moldability of injection molding is improved by providing a non-molding portion (hole) 46 in the side and bottom surfaces of the case 4 such that the non-molding portion 46 extends from the fixing portion 45 to the bottom surface. In this case, like the fixing portion 45, the non-molding portion 46 is preferably formed between adjoining ones of the grooves 24 in order that light leakage from the non-molding portion 46 as a hole is prevented.

With this configuration, light reflected and optically controlled by the grooves 24 can be prevented from being scattered by the fixing portion 45 and/or leaking from the non-molding portion 46. This can suppress formation of an undesirable radiation pattern and light loss by the case 4.

A linear lighting device that is easy to fix to an attachment member, can prevent misassembly, and can produce a high quality illumination pattern can be obtained by the above configuration.

Second Embodiment

A linear lighting device 1' of a second embodiment will be described with reference to FIGS. 8 to 10.

Like elements are denoted with like reference characters in the first and second embodiments, and description thereof will be omitted.

Figure 8:
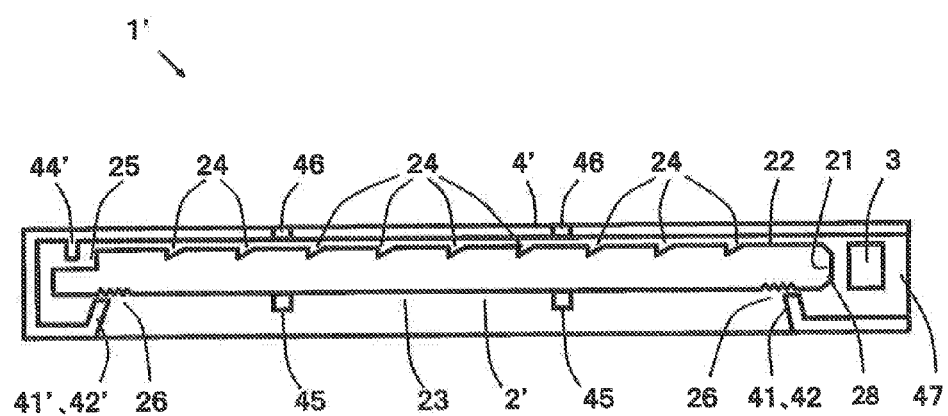
FIG. 8 is a longitudinal section of a linear lighting device of a second embodiment.

FIG. 8 is a longitudinal section of the linear lighting device 1'. The linear lighting device 1' is formed by an elongated light guide 2', a light source 3, and a case 4' accommodating the light guide 2' and the light source 3. The light source 3 is similar to that of the first embodiment. The linear lighting device 1' has an insertion hole 47 on the light source side of the case 4', and the light guide 2' and the light source 3 are inserted into the case 4' through the insertion hole 47 in this order and fixed therein.

Figure 9:
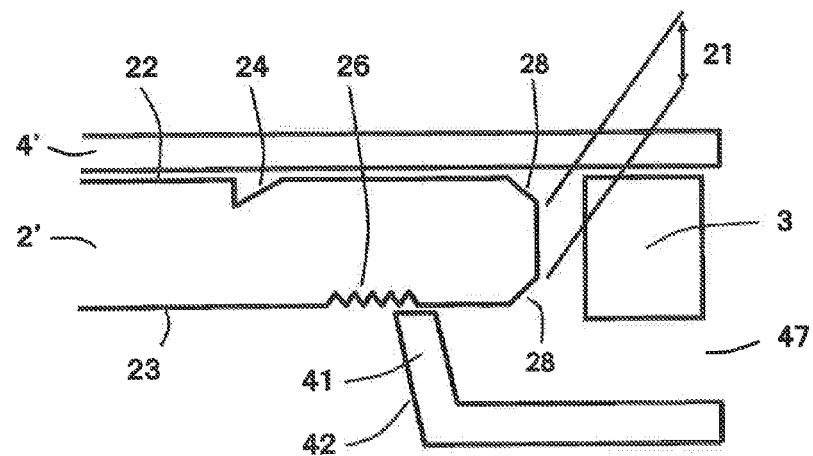
FIG. 9 is an enlarged view on the light source side of FIG. 8.

FIG. 9 is an enlarged longitudinal section of the light source side of the linear lighting device 1'. Unlike the first embodiment, the incident surface 21 of the light guide 2' has a light incidence limiting portion 28 formed by removing the periphery of a region of the incident surface 21 which crosses the optical axis of the light source 3. This can limit the amount of incident light from the light source 3. The linear lighting device of the present invention can be mounted on various locations, but the length of the linear lighting device need be adjusted according to the application and the location. Accordingly, if the same light source 3 is used, illuminance of the light emitted from the linear lighting device with respect to the amount of light emitted from the light source 3 decreases as the linear lighting device becomes longer. Thus, the light incidence limiting portion 28 is provided in the incident surface 21 so that the amount of light according to the length of the light guide 2' can be supplied.

In the present embodiment, the light incidence limiting portion 28 is tilted along the optical axis of the light source 3 so that light of the light source 3 is less likely to be directly incident on the tilted surface. However, the light incidence limiting portion 28 is not limited to the tilted surface, and a light shielding member may be provided which blocks part of the light of the light source 3. In this case, the light shielding member may be directly formed on the light guide 2' so as to cover a part of the incident surface 21. Alternatively, a wall may be provided which protrudes from the case 4' into a region between the incident surface 21 and the light source 3.

Figure 10:
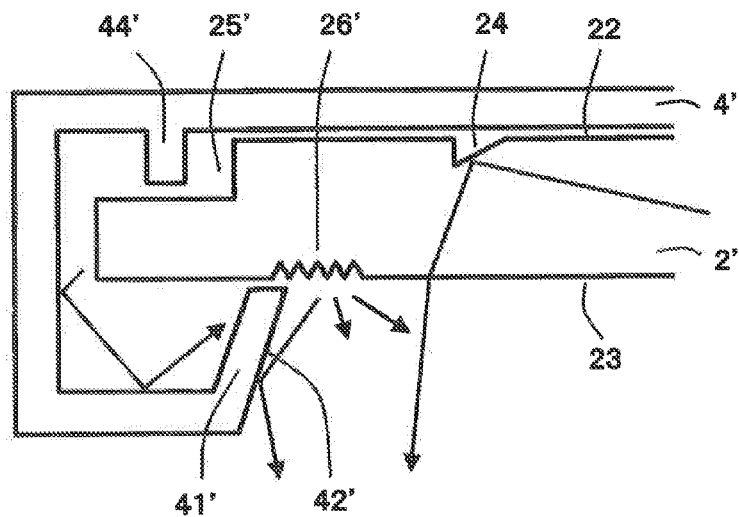
FIG. 10 is an enlarged view on the other end side of FIG. 8.
Figure 11:
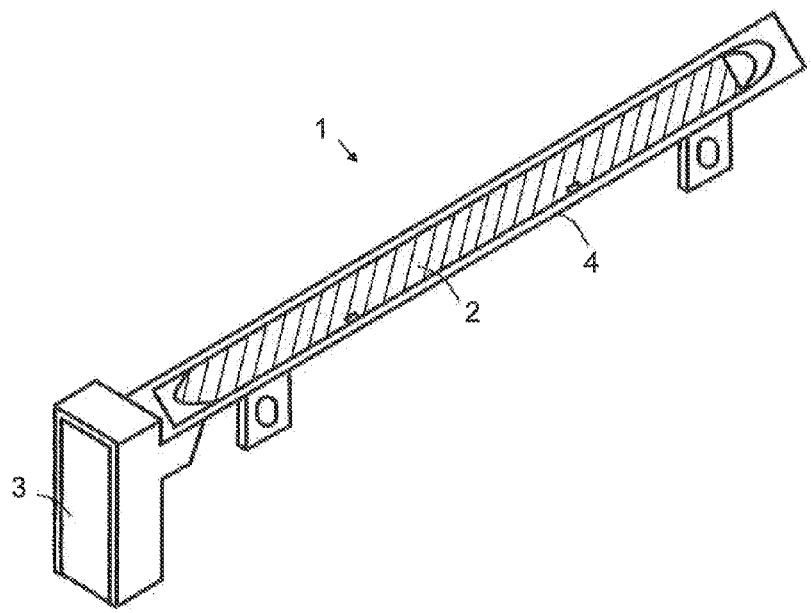
FIG. 11 is a perspective view of a linear lighting device of a third embodiment.

FIG. 10 is an enlarged longitudinal section of the end (the other end) of the linear lighting device 1' on the opposite side from the light source 3. Unlike the first embodiment, in the present embodiment, the case 4' has another light shielding wall 41' and the emitting surface 23 of the light guide 2' has another light scattering portion 26' at this end (the other end) in addition to the light source 3 side of the linear lighting device 1'. This can prevent light emitted from the end (the other end) on the opposite side from the light source 3 from being radiated onto the illumination target. The light emitted from this end is different in appearance from the light reflected by the grooves 24 and emitted from the emitting surface 23. The first embodiment is described with respect to an example in which this light is effectively used to increase the amount of light. However, in applications in which an illumination target region is to be uniformly illuminated, it is preferable not to use the light emitted from this end because optical control is easier. A uniform illumination pattern can be obtained by thus confining the light emitted from this end by the light shielding wall 41' so that this light does not leak to the outside. Like the light shielding wall 41 on the light source 3 side, a difference in brightness tends to be caused by the light shielding wall 41' being located close to the emitting surface 23. It is therefore preferable to form the light scattering portion 26' in the region facing the light shielding wall 41'. In this case, the light scattering portion 26' can be provided such that only its end located on the other end side in the longitudinal direction faces the light shielding wall 41'.

Since the present embodiment has the light shielding wall 41', the side surface of a cutout 25' on the light source side in the light guide 2' is not tilted so as not to easily reflect light, and is substantially perpendicular to the longitudinal direction of the light guide 2'.

In the present embodiment, a protruding portion 44' is a wall protruding toward the cutout 25' of the light guide 2'. This can reduce the weight as a required amount of material can be reduced as compared to the stepped protruding portion 44 of the first embodiment. Since the thick portion of the case 4' is reduced, sinks etc. can be prevented in injection molding, whereby productivity is improved. Even in the linear lighting device 1' having this shape, the protruding portion 44' interferes with the portion of the light guide 2' where no cutout 25' is formed, if the light guide 2' is inserted from the insertion hole 47 in a wrong direction, whereby misassembly can be prevented. The shape of the protruding portion 44' (44) is not particularly limited as long as it can prevent the wrong insertion of the light guide 2'.

Like the first embodiment, a linear lighting device that is easy to fix to an attachment member, can prevent misassembly, and can produce a high quality illumination pattern can be obtained by the configuration of the second embodiment.

Third Embodiment

A linear lighting device 1 of a third embodiment will be described with reference to FIGS. 11 to 14.

Like elements are denoted with like reference characters in the first and third embodiments, and description thereof will be omitted. For purposes of illustration, a region of the light guide 2 which is exposed from the case 4, namely a light emitting region from which light is emitted, is shown hatched in the figures.

Figure 12A:
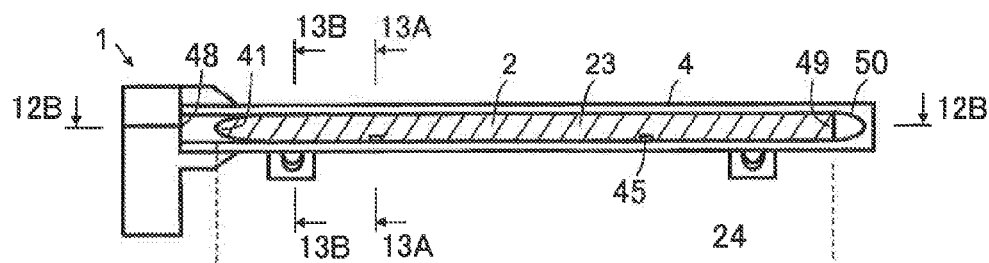
FIG. 12A is a front view of the linear lighting device.
Figure 12B:
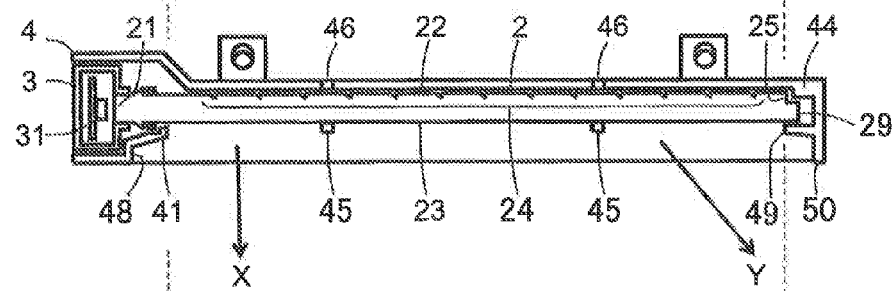
FIG. 12B is a sectional view taken along line 12B-12B in FIG. 12A.

As shown in FIGS. 12A and 12B, at the end on the light source 3 side of the opening in the longitudinal direction, the case 4 has a light shielding wall 41 in a portion facing the emitting surface 23 of the light guide 2. The light shielding wall 41 covers the emitting surface 23 so as not to cause leakage of the light that has not been incident on the light guide 2 from the light source 3. In order to prevent light leakage from a gap between the case 4 and the light guide 2, the light shielding wall 41 is disposed near the emitting surface 23 of the light guide 2 such that at least the distal end of the light shielding wall 41 faces the emitting surface 23. The distal end of the light shielding wall 41 has a curved shape that is curved toward the light source 3, so that the light shielding wall 41 blocks light emitted from the emitting surface 23 in a curved shape. This allows an illumination pattern illuminating an illumination target to have a curved end on the light source 3 side.

A light source-side wall portion 48 is formed on the opening side of the light shielding wall 41 in the normal direction to the emitting surface 23 of the light guide 2. The light source-side wall portion 48 is located at a position outside the curved distal end of the light shielding wall 41 in the longitudinal direction, namely located closer to the light source 3 than the distal end of the light shielding wall 41 in the longitudinal direction, so that the illumination pattern formed in the curved shape by the light shielding wall 41 is not undesirably changed by blocking or reflection of light.

At the other end on the opposite side (the other end face 29 side) of the opening from the light source 3 in the longitudinal direction, the case 4 has another light shielding wall 49 in a portion facing the emitting surface 23 of the light guide 2. The light shielding wall 49 covers the emitting surface 23 so as not to cause leakage of the light emitted from near the other end face 29 of the light guide 2. Like the light shielding wall 41 on the light source side, in order to prevent light leakage from a gap between the case 4 and the light guide 2, the light shielding wall 49 is disposed near the emitting surface 23 of the light guide 2 such that at least the distal end of the light shielding wall 49 faces the emitting surface 23. The light shielding wall 49 also covers the cutout 25 of the light guide 2 and the protruding portion 44 of the case 4.

The case 4 has a light shaping wall 50 on the opening side of the light shielding wall 49 in the normal direction to the emitting surface 23 of the light guide 2. The light shaping wall 50 has a wall shape extending substantially perpendicular to the light shielding wall 49. The wall surface of the light shaping wall 50 has a curved shape that is curved in a direction away from the light source 3, so that the light shaping wall 50 blocks light emitted from the emitting surface 23 in a curved shape. This allows the illumination pattern illuminating the illumination target to have a curved end on the other end side.

Figure 12C:
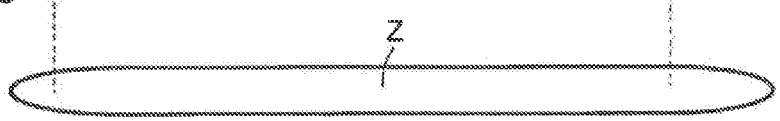
FIG. 12C is a schematic view of an illumination pattern.
Figure 13A:
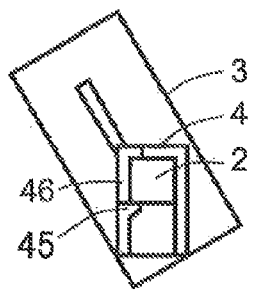
FIG. 13A is a sectional view taken along line 13A-13A in FIG. 12A.
Figure 13B:
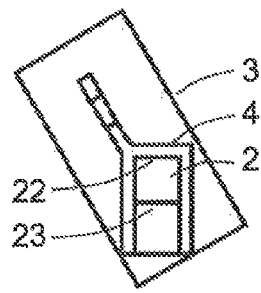
FIG. 13B is a sectional view taken along line 13B-13B in FIG. 12A.

Functions of the light shielding wall 41, 49 and the light shaping wall 50 of the present invention will be described. In FIGS. 12A to 12C, arrow "X," "Y" schematically represent the light beam emitted from the light guide 2, and "Z" represents a region having predetermined illuminance or more in the illumination pattern formed by the linear lighting device 1 (the outer shape or outline of the illumination pattern). Broken line in FIGS. 12A to 12C represents an approximate position of the distal end of the light shielding wall 41, 49.

In the light guide 2, light is guided in a direction away from the light source 3. The light emitted from the light guide 2 is somewhat reflected toward the light source 3 by the grooves 24 in the reflecting surface 22, but most of the light is emitted from the emitting surface 23 in the direction away from the light source 3. Thus, the optical path (propagation distance) of the light beam X on the light source side tends to be shorter than that of the light beam Y on the other end side, and light is diffused in a radial pattern while propagating. The light beam Y having a longer optical path, namely the light traveling toward the other end side, tends to diffuse. As shown in FIG. 12C, the illumination pattern formed by such light is extended more on the other end side than on the light source side, and thus tends to have a vague outline.

The amount of light that is emitted from the light guide 2 tends to be larger near the light shielding wall 49 on the other end side than near the light shielding wall 41 on the light source side. Accordingly, the light shielding wall 41 on the light source side can easily form the illumination pattern into a predetermined shape by the shape of the light shielding wall

41. On the other hand, even if the light shielding wall 49 on the other end side is shaped similarly to the light shielding wall 41 on the light source side, the illumination pattern formed by the light shielding wall 49 is vague. It is therefore difficult for the light shielding wall 49 to form the illumination pattern into a predetermined shape, and it is difficult to balance the illumination pattern between the light source side and the other end side.

In the present invention, in order to use the light that is emitted in a direction farther away from the light source 3 than the light shielding wall 49 on the other end side, the light shaping wall 50 is disposed at a position farther away from the light source 3 than the distal end of the light shielding wall 49. In order to prevent the illumination pattern on the other end side from having a vaguer outline than on the light source side, the other end side of the illumination pattern is formed by using the shape of the distal end of the light shaping wall 50 which is located closer to the illumination target than the light shielding wall 41 on the light source side and the light shielding wall 49 on the other end side in the depth direction of the opening of the case 4. This can prevent the illumination pattern on the other end side from being excessively extended and having a vague outline. The wall surface of the light shaping wall 50 is in the shape of a standing wall extending toward the illumination target member and is a concave curved surface. Accordingly, the wall surface of the light shaping wall 50 can function as a groove for the light near the light shielding wall 49 where the amount of light is large, whereby the illumination pattern can be prevented from being excessively vaguer on the other end side than on the light source side.

In order to obtain a balanced overall illumination pattern, in particular to balance both ends of the illumination pattern, the light shielding wall 41 on the light source side is disposed closer to the emitting surface 23 than the distal end of the light shaping wall 50 on the other end side in the normal direction to the emitting surface 23 of the light guide 2. The distance between the light shielding wall 41 and the illumination target can thus be made larger than that between the distal end of the light shaping wall 50 and the illumination target. As a result, due to light diffusion, the illumination pattern having a vague outline can be obtained on the light source side as well where the illumination pattern is less likely to have a vague outline.

Moreover, since the illumination pattern is extended on the other end side, the light shielding wall 41 and the light shaping wall 50 which form both ends of the illumination pattern have such a curved shape that the light shielding wall 41 is curved to a greater extent than the light shaping wall 50. Thus, the illumination pattern having a slightly curved shape formed by blocking light by the light shaping wall 50 is extended, whereby the illumination pattern on the other end side can be balanced with that on the light source side. The illumination pattern by the light shaping wall 50 is formed as the shape of the distal end of the light shaping wall 50 is extended in the longitudinal direction of the light guide 2. Accordingly, the distal end of the light shaping wall 50 preferably has a shape reduced in size from the shape of the light shielding wall 41 on the light source 3 side in the longitudinal direction of the light guide 2. Both ends of the illumination pattern can be easily balanced in this manner.

The illumination pattern thus formed has an elongated linear shape along the linear lighting device 1, and both ends of the illumination pattern have a curved shape. Thus, the lateral width of the illumination pattern gradually decreases toward the distal end (origin) of the curved shape, and the illumination pattern becomes vaguer toward the distal end of the curved shape, whereby the illumination pattern has a gradational illumination mode in which the distal end of the curved shape has gradually decreased illuminance. This can give the viewer an impression of spaciousness along the linear illumination pattern.

The present embodiment is described with respect to an example in which the distal end of the light shielding wall 41 on the light source 3 side and the distal end of the light shaping wall 50 on the other end side have a curved shape. However, the distal end of the light shielding wall 41 and the distal end of the light shaping wall 50 may have any shape that allows the lateral width of the illumination pattern to be gradually reduced as described above. Examples of such a shape include a curved line such as a parabolic shape, an elliptical shape, or a circular arc shape, and a curved shape formed by combining straight lines.

The case 4 further has the protruding portion 44 located on the light source 3 side with respect to the other end face 29 of the light guide 2 and protruding toward the cutout 25 of the light guide 2. As shown in FIG. 12B, the protruding portion 44 is formed so as to be located in the cutout 25 in the assembled state of the linear lighting device 1. With this configuration, misassembly can be recognized by interference between the protruding portion 44 and the other end face 29 of the light guide 2 if the light guide 2 is attached in a wrong direction. Providing such a structure at the end in the case 4 can suppress the influence on the optical properties of the light guide 2.

The light that has reached the other end face 29 of the light guide 2 is reflected by the case 4 after being reflected by the other end face 29 or being emitted from the other end face 29. The light is thus diffused, producing stray light, which tends to produce an undesirable illumination pattern. In the present embodiment, the light shielding wall 49 that covers the other end face 29 and a part of the emitting surface 23 is provided on the other end side, thereby preventing such stray light from being emitted to the outside of the linear lighting device 1. Stray light is also produced by the cutout 25 of the light guide 2 and the protruding portion 44 of the case 4. Accordingly, the stray light can be more reliably blocked by providing the light shielding wall 49 that also covers the cutout 25 and the protruding portion 44.

In order to reliably obtain this light shielding effect, the distal end of the light shielding wall 49 has a linear shape rather than being curved like the light shaping wall 50 and the light shielding wall 41 on the light source 3 side. Since the light shaping wall 50 primarily forms the illumination pattern on the other end side as described above, the influence of forming such a light shielding wall 49 on the shape of the illumination pattern can be minimized. For example, the shape of the light shielding wall 49 may be similar to that of the light shaping wall 50 if the stray light produced by the other end face 29, the cutout 25 and the protruding portion 44 can be sufficiently blocked.

Figure 14A:
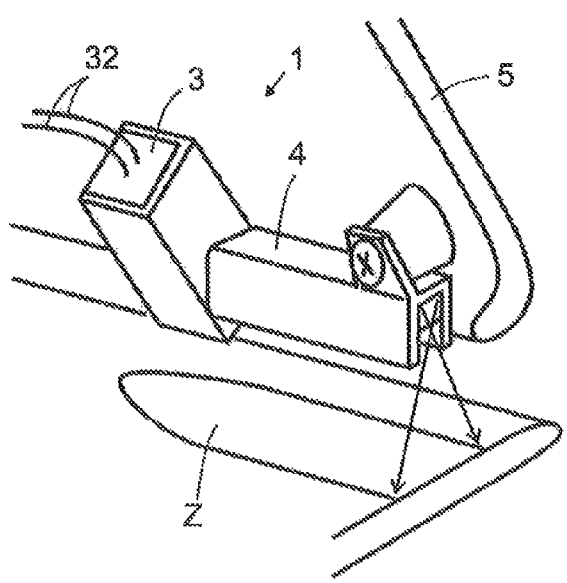
FIGS. 14A and 14B are schematic views of an example in which the linear lighting device is disposed on a vehicle interior panel.
Figure 14B:
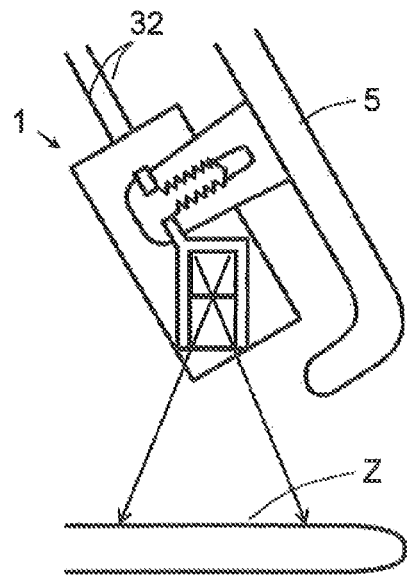

FIGS. 14A and 14B show an example in which the linear lighting device 1 having the above configuration is attached to the back surface of a vehicle interior panel 5. A screw fixing rib protrudes from the rear end of the bottom surface of the case 4 holding the light guide 2, and is fixed to the vehicle interior panel 5 with a screw. FIG. 14A is a perspective view as viewed from the back side, and also shows a sectional view of a region near the screw fixing rib. FIG. 14B is a sectional view along a plane including the screw.

In many cases, the compartment space is formed by a curved surface as it is touched by an occupant, and the vehicle interior panel 5 to which the linear lighting device 1 is attached is tilted. It is therefore necessary to attach the linear lighting device 1 to the tilted vehicle interior panel 5. A harness 32 is connected to the light source 3 of the linear lighting device 1, and the harness 32 is disposed along the vehicle interior panel 5 in order to facilitate wiring work. Accordingly, the overall size in the assembled state can be reduced by disposing the light source 3 such that the longitudinal direction of the light source 3 extends along the direction in which the light source 3 and the harness 3 extend, the direction in which the harness 32 is connected to the light source 3, and the shape of the vehicle interior panel 5.

The optical axis direction of the light that is emitted from the linear lighting device 1 need also be adjusted in order for a predetermined region to be illuminated. Accordingly, particularly in the case of using such a light guide 2 having a quadrilateral section as described in the present embodiment, the light emission direction need be adjusted by disposing the emitting surface 23 such that the emitting surface 23 faces the predetermined region. It is sometimes difficult to align the direction of the light guide 2 having a quadrilateral section with the longitudinal or lateral direction of the light source 3 tilted as described above. Thus, as shown in FIG. 14B, the present invention is configured so that the light guide 2 is rotated by about 45 degrees with respect to the longitudinal direction of the light source 3, and that both side surfaces and the bottom surface of the case 4, which together have a U-shaped section so as to accommodate the light guide 2, and the screw fixing rib that is attached to the vehicle interior panel 5 do not protrude beyond the outer shape of the light source 3 as viewed in the longitudinal direction of the linear lighting device 1. This can make the overall configuration of the linear lighting device 1 compact, and allows the linear lighting device 1 to emit light in a predetermined direction. The function of the case 4 can be improved by increasing the size of both side surfaces of the case 4 so that a predetermined illumination pattern is obtained. In this case, an increase in size of the linear lighting device 1 can be minimized by allowing only the side surfaces of the case 4 to extend beyond the outer shape of the light source 3.

Like the first embodiment, a linear lighting device that is easy to fix to an attachment member, can prevent misassembly, and can produce a high quality illumination pattern can be obtained by the configuration of the third embodiment.

Fourth Embodiment

Figure 15A:
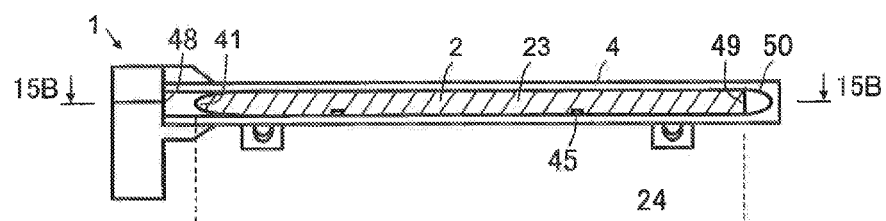
FIG. 15A is a front view of a linear lighting device of a fourth embodiment.
Figure 15B:
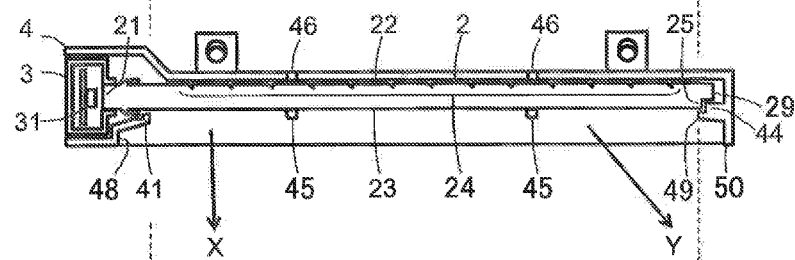
FIG. 15B is a sectional view taken along line 15B-15B in FIG. 15A.
Figure 15C:
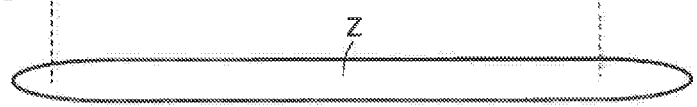
FIG. 15C is a schematic view of an illumination pattern.

A linear lighting device 1 of a fourth embodiment will be described with reference to FIGS. 15A to 15C.

The fourth embodiment is different from the third embodiment only in the positions of the cutout 25 and the protruding portion 44, and is otherwise basically the same as the third embodiment. Thus, like elements are denoted by like reference characters, and description thereof will be omitted.

The cutout 25 is provided on the emitting surface 23 side of the other end of the light guide 2. The protruding portion 44 protruding into the cutout 25 is formed on the inner surface of the case 4 which faces the cutout 25 (the upper surface of the light shielding wall 49). With this configuration, the distance between the cutout 25 and protruding portion 44 and the light shielding well 49 is reduced as compared to the third embodiment in which the cutout 25 is provided on the reflecting surface side. This reduces occurrence of the phenomenon that an undesirable illumination pattern is formed by stray light produced by light reflection by the cutout 25, whereby a higher quality illumination pattern can be produced.

The light shielding wall 49 covers the emitting surface 23, the cutout 25, and the protruding portion 44. With this configuration, the light shielding wall blocks stray light that is produced by light reflection by the cutout and the protruding portion which are provided to prevent misassembly. This can reduce non-uniformity of light at the other end on the opposite side from the light source, whereby a high quality illumination pattern can be produced.

Like the first embodiment, a linear lighting device that is easy to fix to an attachment member, can prevent misassembly, and can produce a high quality illumination pattern can be obtained by the configuration of the fourth embodiment.

Fifth Embodiment

Figure 16:
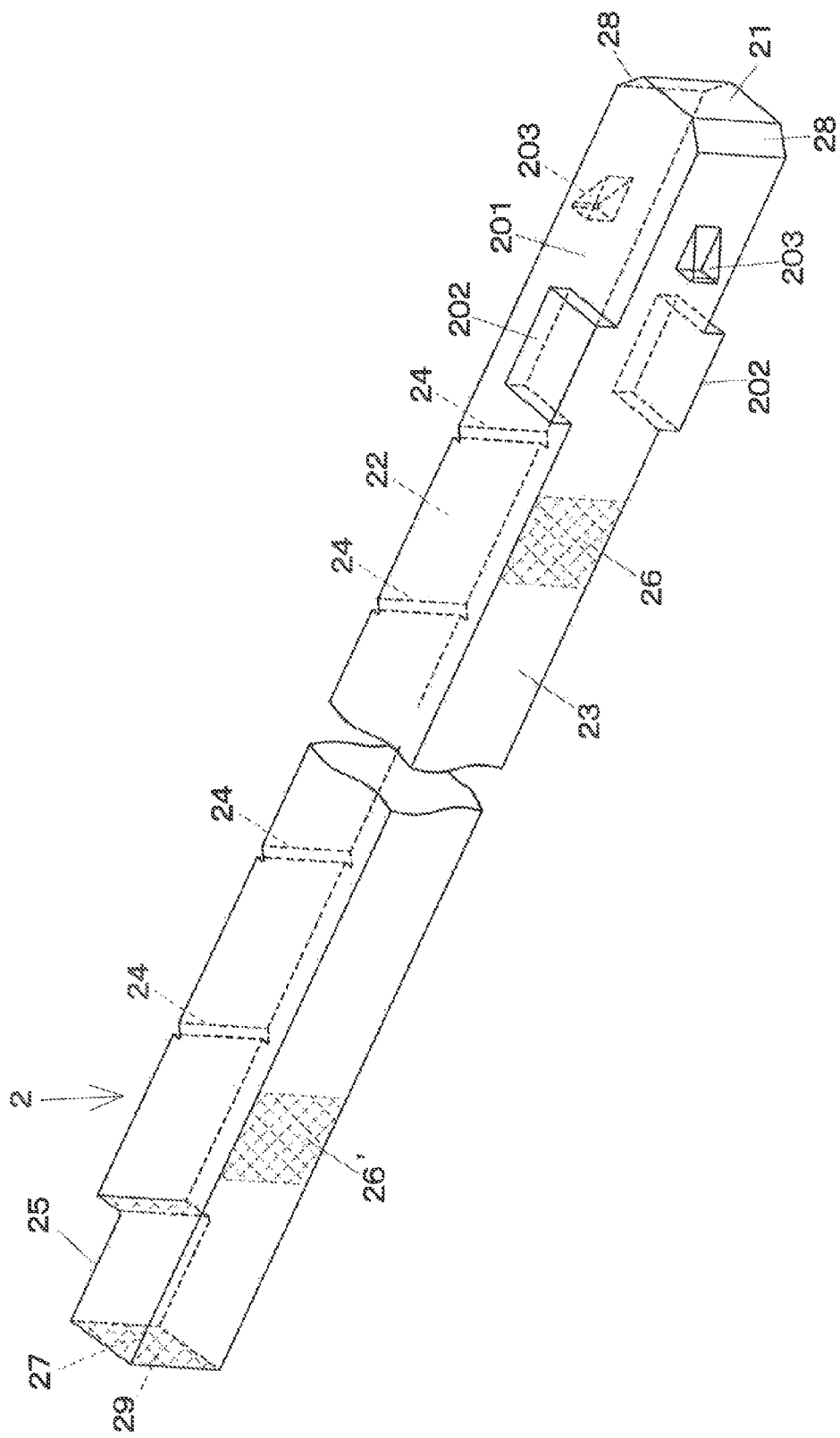
FIG. 16 is a perspective view of a light guide of a linear lighting device of a fifth embodiment.
Figure 18A:
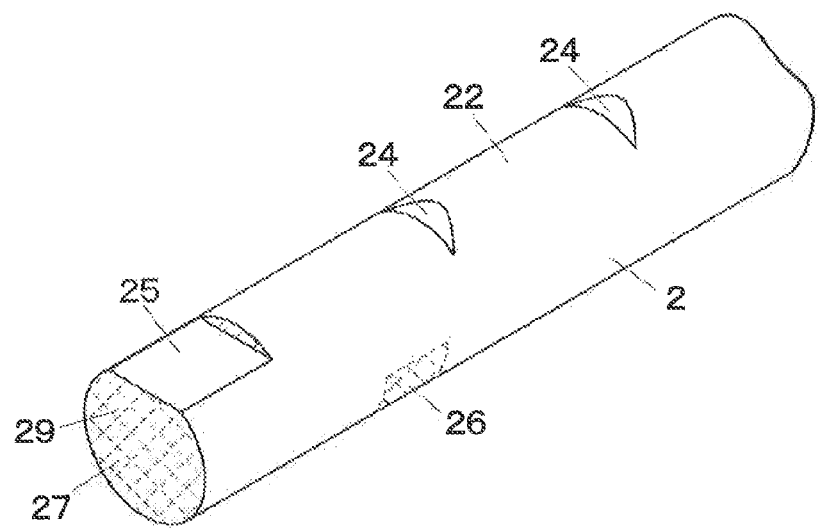
FIG. 18A is a perspective view showing a modification of the light guide.
Figure 18B:
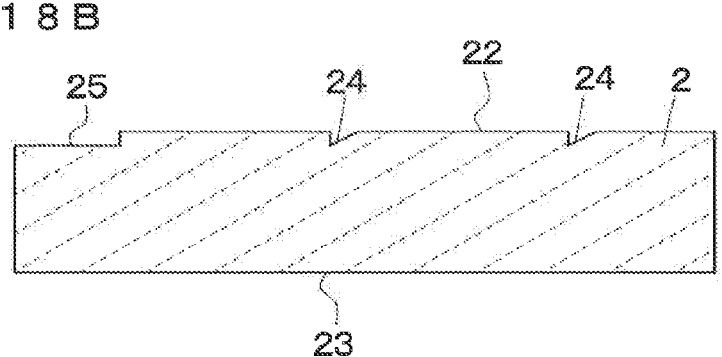
FIGS. 18B to 18D are sectional views thereof.
Figure 18C:
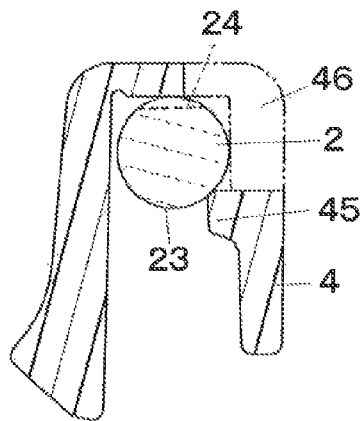
Figure 18D:
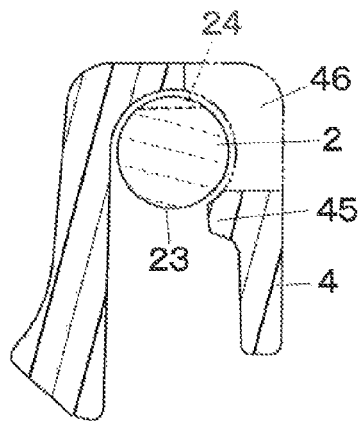

A linear lighting device 1 of a fifth embodiment will be described with reference to FIGS. 16 to 17D.

The fifth embodiment is different from the second embodiment only in that the connection structure of the third embodiment is used to connect the light guide 2 and the light source 3 and in that fitting ribs are provided on the side surfaces of the light guide 2, and the fifth embodiment is otherwise basically the same as the second embodiment. Thus, like elements are denoted by like reference characters, and description thereof will be omitted.

The light guide 2 has a pair of fitting ribs 202 and a pair of fitting pawls 203 near its end on the incident surface 21 side in order to fix the light source 3 to the light guide 2. The fitting ribs 202 are arranged so as to face each other, and the fitting pawls 203 are arranged so as to face each other. The pair of fitting ribs 202 protrude from the lateral reflective surfaces of the light guide 2, respectively. The end on the incident surface 21 side of each fitting rib 202 contacts the distal end of an attachment wall 34 of the light source 3. The pair of fitting pawls 203 protrude from the emitting surface 23 and the reflecting surface 22, respectively. Each fitting pawl 203 engages with an attachment hole 35 of the attachment wall 34. The fitting pawl 203 on the emitting surface 23 is located closer to the incident surface 21 than the fitting pawl 203 on the reflecting surface 22 so that the light guide 2 can be adjusted to the right direction when inserted into the attachment wall 34. This configuration allows the light guide 2 to be accurately attached to the attachment wall 34 of the light source 3 without being tilted.

A satin-embossed pattern (dotted crosshatched region in the figure) as the light scattering portion 26 is formed on the emitting surface 23 in the range of up to 10 mm from the boundary between the light shielding wall 41 and the opening of the case 4 toward the opening and in the range of up to 10 mm from the boundary between the light shielding wall 49 and the opening of the case 4 toward the opening. A satin-embossed pattern as the light scattering portion 27 is formed on the other end 29 of the light guide 2. A satin-embossed pattern is formed in the grooves 24 of the light guide 2 and the stepped portion of the cutout 25.

Like the first embodiment, a linear lighting device that is easy to fix to an attachment member, can prevent misassembly, and can produce a high quality illumination pattern can be obtained by the configuration of the fifth embodiment.

The present invention is not limited to the above embodiments, and may be appropriately modified as described below without departing from the spirit and scope of the invention.

(1) A round bar-shaped light guide 2 may be used as shown in FIGS. 18A to 18D.

(2) As shown in FIG. 19A, a screw hole 72 may be formed between adjoining ones of the grooves 24 so that a screw 71 that fixes the case 4 can be fittingly inserted therein. As shown in FIG. 19B, a fitting hole 77 may be formed between adjoining ones of the grooves 24 so that an object 76 to be engaged is fitted and fixed in the case 4.

(3) In the above embodiments, the case 4 is described as an accommodating member separate from attachment members such as an interior member and a storage member on the vehicle side. However, the case 4 may be integral with the attachment member on the vehicle side, depending on the attachment location. For example, in the case of the instrumental panel light 13, the case 4 may be integrally formed on the back surface of an instrumental panel member. In the case of the storage light in the console portion, the case 4 may be integrally formed with the inside of a storage member of the console portion. Providing the case 4 integrally with the back surface (inside) of a vehicle interior member can reduce the number of parts.

(4) The present invention can be applied particularly to vehicle interior lighting. The present invention is not limited to the vehicle interior lighting, and is applicable to vehicle exterior lighting or lighting for products other than vehicles without departing from the scope and spirit of the invention.

REFERENCE SIGNS LIST

1 linear lighting device
2 light guide
3 light source
4 case
22 reflecting surface
23 emitting surface
24 groove
25 cutout
26 light scattering portion
27 light scattering portion
28 light incidence limiting portion
29 other end face
41 light shielding wall
44 protruding portion
45 fixing portion
46 non-molding portion (hole)
49 light shielding wall
50 light shaping wall

The invention claimed is:

1. A linear lighting device, comprising:
an elongated light guide;
a light source disposed at an end in a longitudinal direction of the light guide; and
a case accommodating the light guide and the light source, wherein
the light guide has a plurality of grooves arranged in the longitudinal direction of the light guide, and has a stepped cutout at the other end on an opposite side from the end,
a protruding portion protruding into the cutout is formed on an inner surface of the case which faces the cutout,
a side surface of the light guide which extends along the longitudinal direction of the light guide serves as an emitting surface,
the case opens along the longitudinal direction of the light guide as to expose the emitting surface of the light guide, and
a light shielding wall that covers the emitting surface, the cutout, and the protruding portion is provided at the other end on an opposite side of the opening of the case from the light source in the longitudinal direction of the light guide.

2. The linear lighting device according to claim 1, wherein a light shaping wall whose wall surface has a curved shape curved in a direction away from the light source is provided on an opening side of the light shielding wall of the case.

3. The linear lighting device according to claim 1, wherein the plurality of grooves have a V-shaped or U-shaped section along the longitudinal direction of the light guide, and are arranged at regular intervals in the longitudinal direction of the light guide, and
the grooves and the cutout are formed so that their respective surfaces facing the light source have similar shapes.

4. The linear lighting device according to claim 3, wherein an interval between the groove adjoining the cutout and the cutout is equal to that between adjoining ones of the grooves.

5. A linear lighting device, comprising:
an elongated light guide;
a light source disposed at an end in a longitudinal direction of the light guide; and
a case accommodating the light guide and the light source, wherein
the light guide has a plurality of grooves arranged in the longitudinal direction of the light guide, and has a stepped cutout at the other end on an opposite side from the end,
a protruding portion protruding into the cutout is formed on an inner surface of the case which faces the cutout,
a side surface of the light guide which extends along the longitudinal direction of the light guide serves as an emitting surface,
the case opens along the longitudinal direction of the light guide so as to expose the emitting surface of the light guide, and
a light shielding wall that covers the emitting surface of the light guide is provided at an end on a light source side of the opening of the case in the longitudinal direction of the light guide.

6. The linear lighting device according to claim 5, wherein a light scattering portion is formed on the emitting surface so as to include a region facing the light shielding wall on the light source side.

7. A linear lighting device, comprising:
an elongated light guide;
a light source disposed at an end in a longitudinal direction of the light guide; and
a case accommodating the light guide and the light source, wherein
the light guide has a plurality of grooves arranged in the longitudinal direction of the light guide, and has a stepped cutout at the other end on an opposite side from the end,
a protruding portion protruding into the cutout is formed on an inner surface of the case which faces the cutout,
a side surface of the light guide which extends along the longitudinal direction of the light guide serves as an emitting surface,
the case opens along the longitudinal direction of the light guide so as to expose the emitting surface of the light guide, and
a light shielding wall that covers the emitting surface of the light guide is provided at the other end on the opposite side of the opening of the case from the light source in the longitudinal direction of the light guide.

8. The linear lighting device according to claim 7, wherein a light scattering portion is formed on the emitting surface so as to include a region facing the light shielding wall on the opposite side from the light source.

9. The linear lighting device according to claim 1, wherein a light scattering portion is formed on an end face of the other end of the light guide.

10. A linear lighting device, comprising:

an elongated light guide;

a light source disposed at an end in a longitudinal direction of the light guide; and a case accommodating the light guide and the light source, wherein the light guide has a plurality of grooves arranged in the longitudinal direction of the light guide, and has a stepped cutout at the other end on an opposite side from the end, a protruding portion protruding into the cutout is formed on an inner surface of the case which faces the cutout, a side surface of the light guide which extends along the longitudinal direction of the light guide serves as an emitting surface, the case opens along the longitudinal direction of the light guide so as to expose the emitting surface of the light guide, a first light shielding wall that covers the emitting surface and that has a curved shape curved toward the light source side is provided at an end on a light source side of the opening of the case in the longitudinal direction of the light guide, and a second light shielding wall that covers the emitting surface is provided at the other end on an opposite side of the opening of the case from the light source in the longitudinal direction of the light guide, and a light shaping wall whose wall surface has a curved shape curved in a direction away from the light source is provided on an opening side with respect to the second light shielding wall.

11. The linear lighting device according to claim 10, wherein the curved shape of the first light shielding wall on the light source side is curved to a greater extent than that of the light shaping wall.

12. The linear lighting device according to claim 10, wherein a distal end of the light shaping wall has a curved shape reduced in size from the curved shape of the first light shielding wall on the light source side in the longitudinal direction of the light guide.

13. The linear lighting device according to claim 10, wherein the distal end of the light shaping wall is located on the opening side at a position farther away from the emitting surface than the first light shielding wall on the light source side in a depth direction of the opening.

14. The linear lighting device according to claim 10, wherein the second light shielding wall on the opposite side from the light source is provided so as to cover the emitting surface, the cutout, and the protruding portion.

15. The linear lighting device according to claim 1, wherein the case has a hole extending therethrough, and the hole is formed so as to be located between adjoining ones of the grooves of the light guide.

16. The linear lighting device according to claim 6, wherein the light scattering portion is formed in a range of at least 2 mm and at most 10 mm from a boundary between the light shielding wall on the light source side and the opening toward the opening.

17. The linear lighting device according to claim 1, wherein an incident surface at the end of the light guide is tilted to face a reflecting surface of the light guide in which the plurality of grooves are arranged so that the incident surface refracts an optical axis of the light source toward the reflecting surface when light is incident on the incident surface.

18. The linear lighting device according to claim 17, wherein the incident surface is tilted by 3 to 7° with respect to a plane perpendicular to the reflecting surface.

19. The linear lighting device according to claim 1, wherein an incident surface at the end of the light guide is tilted to face the emitting surface so that the incident surface refracts an optical axis of the light source toward the emitting surface when light is incident on the incident surface.

20. The linear lighting device according to claim 19, wherein the incident surface is tilted by 3 to 7° with respect to a plane perpendicular to the optical axis of the light source.

21. The linear lighting device according to claim 1, wherein an incident surface at the end of the light guide has a light incidence limiting portion that limits an amount of incident light from the light source.

22. The linear lighting device according to claim 21, wherein the light incidence limiting portion is formed by removing a periphery of a region of the incident surface which crosses the optical axis of the light source.

23. The linear lighting device according to claim 1, wherein the cutout is formed on an emitting side surface of the other end of the light guide.

* * * * *